United States Patent [19]

Richardson

[11] Patent Number: 5,401,049
[45] Date of Patent: Mar. 28, 1995

[54] HEAVY-DUTY, SEMI-INDEPENDENT SUSPENSION SYSTEM FOR A WHEELED VEHICLE

[75] Inventor: John A. Richardson, Windsor, Canada

[73] Assignee: Ford Motor Company, Dearborn, Mich.

[21] Appl. No.: 109,758

[22] Filed: Aug. 20, 1993

[51] Int. Cl.6 .................... B60G 11/113; B60G 11/04
[52] U.S. Cl. .................... 280/663; 280/669; 280/694; 280/718
[58] Field of Search ............. 280/669, 663, 662, 666, 280/718, 720, 694, 691, 699, 692, 697; 267/52

[56] References Cited

U.S. PATENT DOCUMENTS

| | | | |
|---|---|---|---|
| 1,804,713 | 5/1931 | Stockton | 280/694 |
| 1,884,474 | 10/1932 | Wolforth | 280/694 |
| 1,940,795 | 12/1933 | Gerardi | 267/52 |
| 1,944,441 | 1/1934 | MacPherson | 280/663 |
| 1,976,409 | 10/1934 | Nutt . | |
| 3,064,750 | 11/1962 | Buchwald | 267/52 |
| 3,241,854 | 3/1966 | Hamilton | 280/669 |
| 3,948,337 | 4/1976 | Richardson et al. . | |
| 4,271,922 | 6/1981 | Kishline | 280/666 |
| 4,436,175 | 3/1984 | Watanabe et al. | 280/691 |
| 4,533,157 | 8/1985 | Hoenle et al. | 280/718 |
| 4,607,861 | 8/1986 | Eisenberg et al. | 280/689 |
| 4,687,224 | 8/1987 | Selzer | 280/718 |
| 4,779,894 | 10/1988 | Cowburn | 280/694 |
| 4,804,205 | 2/1989 | Parsons | 280/718 |
| 4,887,841 | 12/1989 | Cowburn et al. | 280/694 |

FOREIGN PATENT DOCUMENTS

| | | | |
|---|---|---|---|
| 0125297 | 11/1931 | Austria | 280/669 |
| 2038734A | 7/1980 | United Kingdom | 280/688 |

*Primary Examiner*—Margaret A. Focarino
*Assistant Examiner*—Peter C. English
*Attorney, Agent, or Firm*—Raymond L. Coppiellie; Roger L. May

[57] ABSTRACT

A semi-independent suspension system for a wheeled vehicle is of a Short Super Long Arm (SSLA) configuration. The suspension system includes a beam having a first end and a second end. A first wheel carrier is coupled to the first end of the beam. A second wheel carrier is coupled to the second end of the beam. A first bifurcated upper control arm (A-arm) is pivotally coupled between the frame and the first wheel carrier. A second bifurcated upper control arm is pivotally coupled between the frame and the second wheel carrier. First and second springs, each coupled between an end of the beam and the frame, support the frame of the vehicle on the beam. The center of the springs are connected to the beam by a mounting bracket, which has a central opening for receiving a half shaft for driving a wheel associated with the wheel carrier.

18 Claims, 3 Drawing Sheets

HEAVY-DUTY, SEMI-INDEPENDENT SUSPENSION SYSTEM FOR A WHEELED VEHICLE

BACKGROUND OF THE INVENTION

1. Field of the Invention

The present invention relates to vehicle suspension systems. More specifically, the invention relates to a semi-independent suspension design that can be used in either a front- or rear-suspension application in either a two- or four-wheel drive vehicle.

2. Related Art

A variety of suspension systems are available for cars, trucks and other wheeled vehicles. The particular suspension design selected depends on a number of considerations. These considerations include the purpose of the vehicle, the gross vehicle weight, whether the suspension is for the front or the rear of the vehicle, whether the wheels are steerable, whether the wheels are driven, et cetera. No suspension is ideal for all applications.

For heavy-duty applications, a conventional beam axle design provides strength, rigidity, accurate steering and tire-wear control. The beam axle, however, provides poor articulation (suspension flex; jounce and rebound). Independent wheel suspensions tend to provide better articulation. However, independent suspensions tend to provide less accurate steering and have greater tire-wear, smaller load-carrying capacity and lower rigidity. Examples of independent wheel suspensions include the MacPherson suspension, the twin I-beam suspensions disclosed in U.S. Pat. No. 3,948,337 to Richardson et al. and United Kingdom Patent Application 2,038,734 of Kishline, and short-long-arm (SLA) suspensions.

Due to its strength and rigidity, the beam-axle suspension is used for heavy-duty applications. When articulation is of primary concern, independent suspensions are used. What is needed is a suspension which combines the strength and rigidity of the beam axle with the articulation of an independent suspension.

SUMMARY OF THE INVENTION

The present invention is a Short, Super Long Arm (SSLA) suspension system for use in a front or rear, fixed or steered, driven or free-wheeling application. The invention combines the strength and rigidity of a beam suspension with the articulation of an independent suspension.

The suspension system of the invention includes a beam having a first end and a second end. A wheel carrier is coupled to each end of the beam via a lower ball joint. An upper portion of each wheel carrier is coupled to the frame of the vehicle by a bifurcated upper control arm (A-arm). A pair of leaf springs are coupled to the frame of the vehicle and support the weight of the frame on the ends of the beam. The leaf springs are coupled to the beam via two mounting brackets. Each mounting bracket has a central opening or passage which allows a half shaft to pass through the mounting bracket to drive the wheels of the vehicle. A parallel link steering system is provided to steer the vehicle.

DETAILED DESCRIPTION OF THE PREFERRED EMBODIMENTS

The preferred embodiments of the invention are discussed in detail below. While specific configurations and arrangements are discussed, it should be understood that this is done for illustration purposes only. A person skilled in the relevant art will recognize that other configurations and arrangements may be used without departing from the spirit and scope of the invention.

The preferred embodiments of the invention are described with reference to the figures, where like reference numbers indicate like elements. Also in the figures, the left-most digit of each reference number corresponds to the figure in which the reference number is first used.

The suspension system of the invention is a Short, Super Long Arm (SSLA) suspension. The suspension provides semi-independent wheel articulation and may be used for either front- or rear-wheel applications. The presently-preferred embodiments of the SSLA suspension are described below. These include a non-driven front suspension and a driven (front- or four-wheel drive) front suspension. In addition, the presently preferred embodiments utilize leaf springs. However, a person skilled in the relevant art will recognize that the SSLA suspension could be implemented with other types of springs. These include coil springs, torsion bars, and the like.

Figure 1:
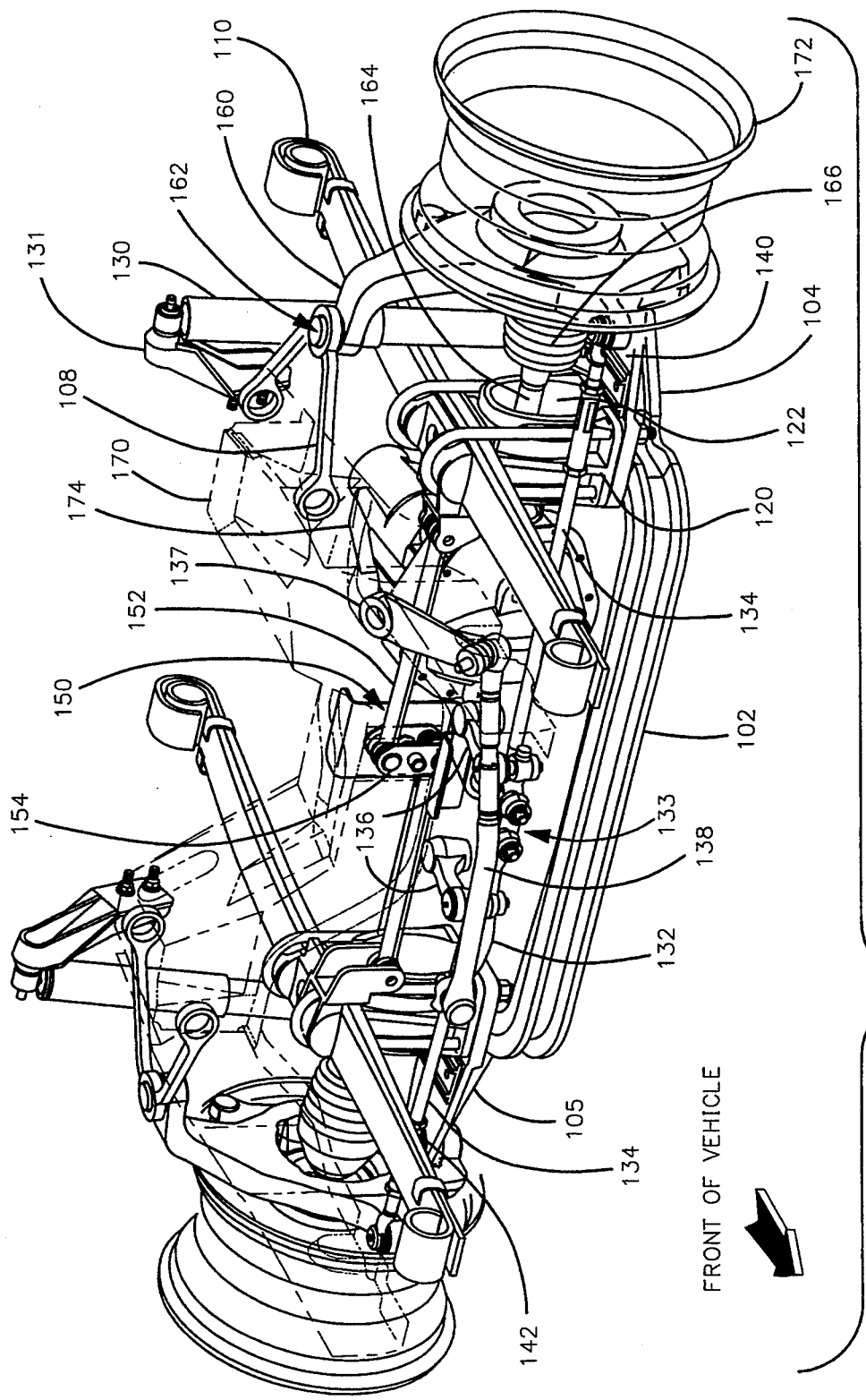
FIG. 1 is a perspective view illustrating the primary components of the semi-independent suspension system of the invention.
Figure 2:
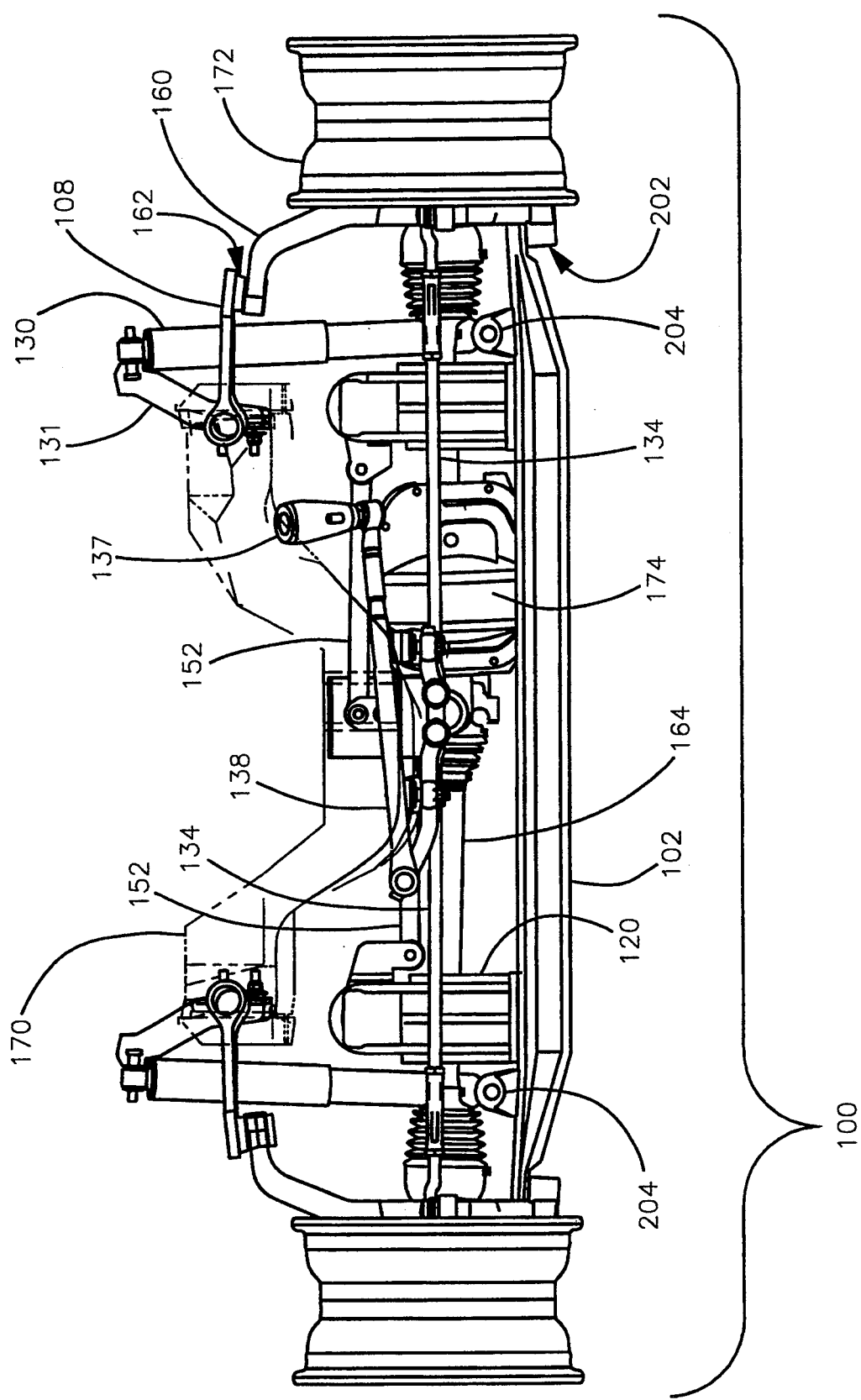
FIG. 2 is a front view of the semi-independent system suspension of the invention.
Figure 3:
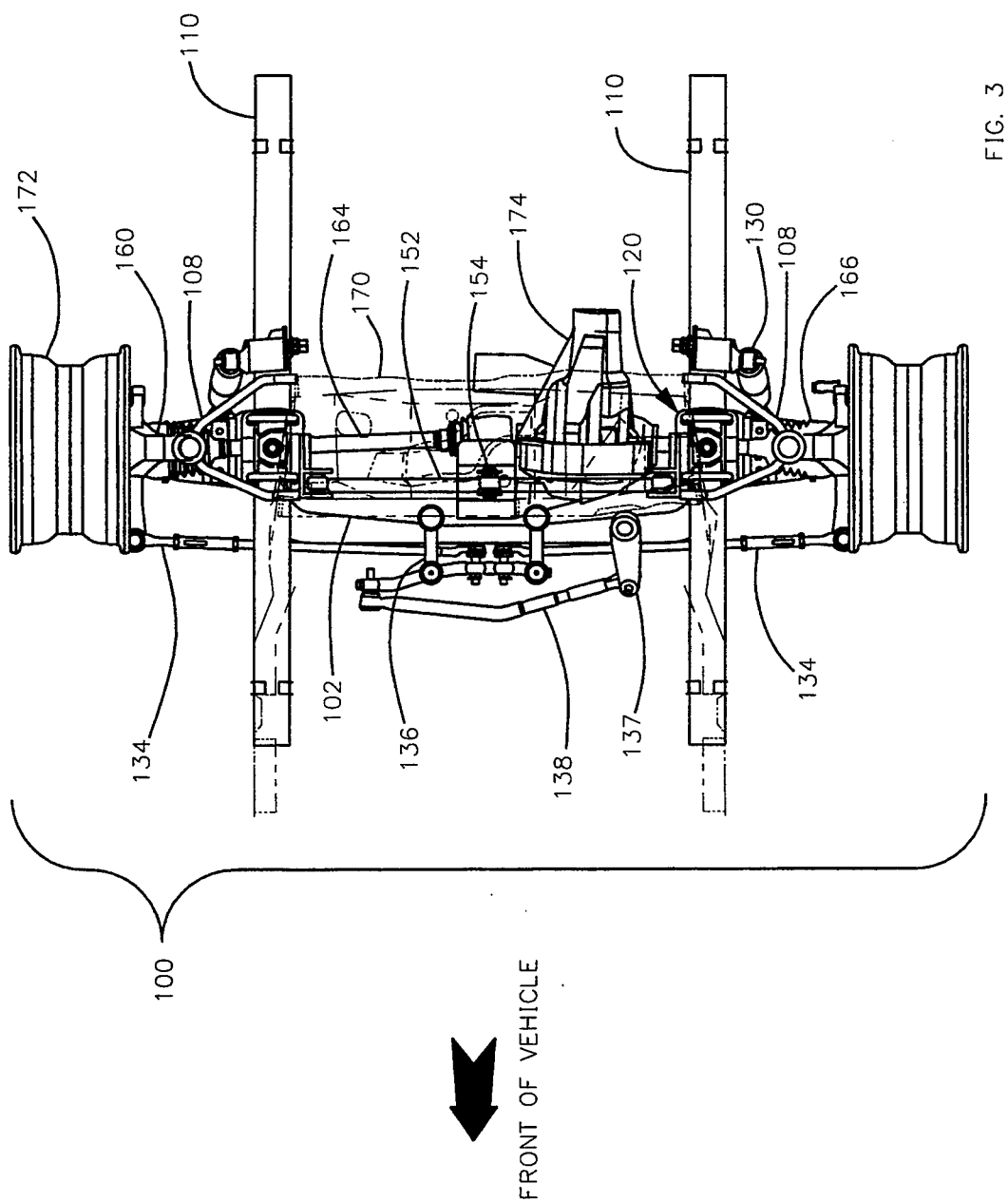
FIG. 3 is a top view of the semi-independent suspension system of the invention.

The driven-wheel front SSLA suspension, indicated by reference number 100, is now described with reference to the figures. While reference is made primarily to FIG. 1, alternate views of SSLA suspension 100 are provided in FIGS. 2 and 3. FIG. 1 shows a perspective view, FIG. 2 shows a front view, and FIG. 3 shows a top view of SSLA suspension 100. The elements of the suspension are shown connected to a vehicle frame 170 (shown in phantom).

Referring first to FIG. 1, suspension 100 includes a beam 102. Beam 102 has a left end 104 and a right end 105. Each end 104, 105 of beam 102 includes a mounting platform 140 and a lower ball joint mounting seat 142 (shown partially obscured on the right-side of the suspension only). Beam 102 is substantially symmetrical. Beam 102 traverses the vehicle and couples the right side of the suspension with the left side of the suspension. For ease of discussion, only the left side of the suspension will be described in detail. The right side of the suspension is a substantially identical mirror image of the left side.

The left side of the suspension includes a mounting bracket 120, an upper control arm 108, a leaf spring 110, a shock absorber 130 and a wheel carrier (knuckle) 160. A lower portion of wheel carrier 160 is coupled to lower ball joint mounting seat 142 via a ball joint 202. An upper portion of wheel carrier 160 is coupled to the frame 170 of the vehicle via upper control arm 108. Upper control arm 108 is an A-arm or bifurcated control arm having two ends pivotally coupled to frame 170 and an apex coupled to wheel carrier 160 via a ball joint 162.

Leaf spring 110 is provided to support frame 170 on beam 102. The ends of leaf spring 110 are pivotally coupled to frame 170 via shackle brackets. The center of leaf spring 110 is coupled to mounting platform 140 via mounting bracket 120. Mounting bracket 120 is formed from two U-bolts and a U-shaped metal member. Mounting bracket 120 includes a central opening 122 to allow passage of a half-shaft 164 for driving a wheel 172 associated with wheel carrier 160. As is known in the art, half shaft 164 includes a CV joint 166.

A differential unit 174 provides driving torque to wheels 172 via half shafts 164. The right side half shaft 164 is extensible to accommodate articulation of wheels 172 relative to differential unit 174.

Shock absorbers 130 provide damping for suspension 100. An upper portion of each shock absorber 130 is connected to frame 170 via a bracket 131. A lower portion of each shock absorber 130 is connected to beam 102 via a bracket 204.

Suspension 100 pivotally couples to frame 170 of the vehicle at four major points. These include (1) the two ends of the left-side leaf spring 110 (via shackle brackets), (2) the two ends of the right-side leaf spring 110 (via shackle brackets), (3) the two ends of left-side upper control arm 108 (via bushings), and (4) the two ends of right-side upper control arm 108 (via bushings).

Beam 102 maintains the lower ball joints 202 at a fixed tread. Each lower ball joint articulates on a triangle having a base formed by a line extending from the opposite lower ball joint mounting seat 142 to the pivot point formed at the shackle bracket which attaches the rear end of the opposite leaf spring 110. The apex of the triangle is at the articulating ball joint (i.e., lower ball joint mounting seat 142).

Each upper ball joint 162 articulates on a curve determined by upper control arm 108. The term "short, super long arm" represents the fact that each upper ball joint 162 articulates through a relatively short radius arc (dictated by upper control arm 108), while each lower ball joint 202 articulates through a relatively very long radius arc (dictated by beam 102).

Steering is provided by a parallel link steering system 133. The parallel link steering system includes left- and right-side tie rods 134, an idler link 132, left- and right-side idler pivots 136, a Pittman arm 137, and a drag link 138. Parallel link steering systems are known in the art.

SSLA suspension 100 displays excellent longitudinal (front-to-back) stability by virtue of the stability of leaf springs 110. To enhance the lateral stability of the suspension without introducing the geometry mismatch of a simple lateral track bar, a Watt's linkage 150 is provided. Watt's linkage 150 includes left- and right-side rods 152 and a coupler 154. Coupler 154 is pivotally connected to frame 170 of the vehicle between leaf springs 110 about a center pivot point. Left- and right-side rods 152 are connected between coupler 154 and mounting brackets 120 on the left- and right-sides of the vehicle, respectively. The Watt's linkage is known in the art. The Watt's linkage provides additional lateral stability to SSLA suspension 100.

The specifications of a presently preferred, exemplary embodiment of SSLA suspension 100 are now described. As explained above, beam 102 maintains lower ball joints 202 in a fixed tread. A substantially vertical axis can be drawn between each upper ball joint 162 and the corresponding lower ball joint 202. These axes are known as the king pins. The spindle center line is defined as an axis drawn between left CV joint 166 and right CV joint 166. In this exemplary embodiment, the spindle center line intersects each king pin at a point 12.7 cm from the lower ball joint and 50.8 cm from the upper ball joint. This yields a four-to-one geometry ratio. This means that articulation of the spindle centerline is being dictated by a factor of four-to-one by the beam versus the upper control arm. The result is less camber change and less caster change during suspension articulation.

Also in this exemplary embodiment, the caster angle is optimized at 2.0°. The suspension travels 197 mm in the vertical direction from full rebound to full jounce. The design height (nominal position) at full gross vehicle weight (for a 5,000 lb. from end) is 100 mm down from full jounce (or 97 mm up from full rebound). The suspension geometry is matched to provide substantially parallel arcs of travel for the upper and lower ball joints from 65 mm above nominal design position (jounce) to 35 mm down in rebound. This results in an optimization of the caster and camber angles for the central 100 mm of travel. Since full jounce or full rebound rarely occur, this optimizes the suspension over the normally used range.

Watt's linkage 150 provides lateral stability to the suspension when used in a front (steered) wheel application. The Watt's linkage causes the suspension to track straight as the wheels go up and down. This is known as neutral steer. This prevents the suspension from self-steering, caused by lateral movement of the suspension.

As the suspension articulates, differences in the geometry between the upper control arms and the beam 102 results in the king pin pivoting about a point. This point is known as the "instant center." Ideally, the tie rods would connect to the wheel carrier at this instant center. This would result in zero self-steer as the suspension articulates.

SSLA suspension 100 does not place the tie rods exactly at the instant center. However, it is close enough to the instant center, such that less than one degree of toe steer results during full articulation of the suspension system. Further, because the steering is a parallel link system, the effects of the toe steer are equal and opposite between the two wheels. This results in a cancellation of the toe steer such that zero net steer results.

Computer modeling has indicated that SSLA suspension 100 is well balanced with no geometric glitches. In addition, the suspension is extremely strong and rigid. Computer modelling, with a theoretical 6 G load (e.g., during severe off-road bounce), has shown that the lower ball joint will display only 0.8 mm of non-permanent deflection (well below yield of the beam material).

Under severe braking loads, a conventional beam axle will transmit a large braking torque to the leaf springs. As compared with the conventional beam axle, SSLA suspension 100 will transmit only 39% of this torque to the leaf springs.

The preferred embodiment of the invention has been illustrated employing leaf springs as the primary suspension means. It will be apparent to one skilled in the relevant art that other spring mechanisms could be used with the SSLA suspension. These include coil springs, torsion bars and the like. If alternate spring means are used to implement the SSLA suspension, minor modification within the purview of one skilled in the relevant art will be required. For example, in a coil spring embodiment, radius arms would be required to provide longitudinal stability to the suspension. The radius arms would be connected between the frame and the beam in a conventional manner, except that ball joints would be used to connect each radius arm to the frame. By coupling each radius arm to the frame using a ball joint, the power hop tendencies of coil spring suspensions would be eliminated.

It will be further apparent to a person skilled in the relevant art that a non driven-wheel embodiment of the invention is substantially identical to the driven-wheel embodiment shown in the figures except that the elements (i.e., the differential, half shafts and CV joints) which drive the wheels would be omitted.

Although the invention has been described and illustrated with a certain degree of particularity, it is understood that one skilled in the relevant art will recognize a variety of additional applications and appropriate modifications within the spirit of the invention and scope of the claims.

What is claimed is:

1. A semi-independent suspension system for a wheeled vehicle having a frame, the system comprising:
   a beam having a first end and a second end;
   a first wheel carrier coupled to said first end of said beam;
   a second wheel carrier coupled to said second end of said beam;
   a first bifurcated upper control arm pivotally coupled between the frame and said first wheel carrier;
   a second bifurcated upper control arm pivotally coupled between the frame and said second wheel carrier;
   first spring means, coupled between said first end of said beam and the frame, for supporting the frame of the vehicle on said beam;
   second spring means, coupled between said second end of said beam and the frame, for supporting the frame of the vehicle on said beam;
   first mounting means for coupling said first spring means to said first end of said beam; and
   second mounting means for coupling said second spring means to said second end of said beam,
   wherein each said mounting means includes a central passage to allow a half shaft to pass through said mounting means for driving a wheel associated with said respective wheel carrier.

2. The semi-independent suspension system of claim 1, wherein each of said first and second spring means comprises an elongated leaf spring having ends pivotally coupled to the frame and a central portion coupled to said beam.

3. The semi-independent suspension system of claim 2, further comprising:
   a first shock absorber mounted between the frame and said first end of said beam; and
   a second shock absorber mounted between the frame and said second end of said beam.

4. The semi-independent suspension system of claim 2, wherein each said wheel carrier is coupled to said beam by a ball joint and to said respective upper control arm by a ball joint, the system further comprising steering means, coupled to said first and second wheel carriers, for allowing said vehicle to be steered.

5. The semi-independent suspension system of claim 4, wherein said steering means is a parallel link steering system.

6. The semi-independent suspension system of claim 5, further comprising a Watt's linkage having a pivot point coupled to the frame, a first distal end coupled to said first spring means, and a second distal end coupled to said second spring means.

7. The semi-independent suspension system of claim 6, further comprising:
   a first mounting platform at said first end of said beam, wherein said first mounting means is for coupling said first leaf spring to said mounting platform at said first end of said beam; and
   a second mounting platform at said second end of said beam, wherein said second mounting means is for coupling said second leaf to said mounting platform at said second end of said beam.

8. The semi-independent suspension system of claim 1, wherein said central passages allow a half shaft to pass unconstrained therethrough.

9. A semi-independent suspension system for suspending a vehicle frame above a pair of wheels, the system comprising:
   an elongated beam having a first end and a second end and defining a transverse axis of the vehicle, each said end including a mounting platform and a lower ball joint seat;
   a first wheel carrier coupled to said first end of said beam at said lower ball joint seat via a ball joint;
   a second wheel carrier coupled to said second end of said beam at said lower ball joint seat via a ball joint;
   a first bifurcated upper control arm having two ends pivotally coupled to the frame and an apex portion pivotally coupled to said first wheel carrier via a ball joint;
   a second bifurcated upper control arm having two ends pivotally coupled to the frame and an apex portion pivotally coupled to said second wheel carrier via a ball joint;
   first spring means, coupled between said mounting platform at said first end of said beam and the frame, for supporting the frame of the vehicle on said beam;
   second spring means, coupled between said mounting platform at said second end of said beam and the frame, for supporting the frame of the vehicle on said beam;
   first mounting means for coupling said first spring means to said first end of said beam; and
   second mounting means for coupling said second spring means to said second end of said beam,
   wherein each said mounting means includes a central passage to allow a half shaft to pass through said mounting means for driving a wheel associated with said respective wheel carrier.

10. The semi-independent suspension system of claim 9, wherein each of said first and second spring means comprises an elongated leaf spring having ends pivotally coupled to the frame and a central portion coupled to said beam.

11. The semi-independent suspension system of claim 10, further comprising steering means, coupled to said first and second wheel carriers, for allowing said vehicle to be steered.

12. The semi-independent suspension system of claim 11, wherein said steering means is a parallel link steering system.

13. The semi-independent suspension system of claim 12, further comprising a Watt's linkage having a pivot point coupled to the frame, a first distal end coupled to said first leaf spring adjacent said first mounting platform, and a second distal end coupled to said second leaf spring adjacent said second mounting platform.

14. The semi-independent suspension system of claim 13, further comprising:
   a first shock absorber mounted between the frame and said first end of said beam; and
   a second shock absorber mounted between the frame and said second end of said beam.

15. The semi-independent suspension system of claim 14,
   wherein said first mounting means is for coupling said first leaf spring to said mounting platform at said first end of said beam; and
   wherein said second mounting means is for coupling said second leaf spring to said mounting platform at said second end of said beam.

16. The semi-independent suspension system of claim 9, wherein said central passages allow a half shaft to pass unconstrained therethrough.

17. A semi-independent suspension system for suspending a vehicle frame above a pair of wheels, the system comprising:
   an elongated beam having first and second ends, each end having a mounting platform and a lower ball joint mounting seat;
   a first wheel carrier having a lower portion coupled to said first end of said beam at said lower ball joint mounting seat;
   a first bifurcated, upper control arm having first and second ends pivotally coupled to the frame and an apex portion pivotally coupled to an upper portion of said first wheel carrier;
   a second wheel carrier having a lower portion coupled to said second end of said beam at said lower ball joint mounting seat;
   a second bifurcated, upper control arm having first and second ends pivotally coupled to the frame and an apex portion pivotally coupled to an upper portion of said second wheel carrier;
   a first elongated leaf spring having first and second ends pivotally coupled to the frame and a central portion coupled to said beam at said first end;
   a second elongated leaf spring having first and second ends pivotally coupled to the frame and a central portion coupled to said beam at said second end;
   first mounting means for coupling said first leaf spring to said first end of said beam; and
   second mounting means for coupling said second leaf spring to said second end of said beam,
   wherein each said mounting means includes a central passage to allow a half shaft to pass through said mounting means for driving a wheel associated with said respective wheel carrier.

18. The semi-independent suspension system of claim 17, wherein said central passages allow a half shaft to pass unconstrained therethrough.

* * * * *